Figure 1:
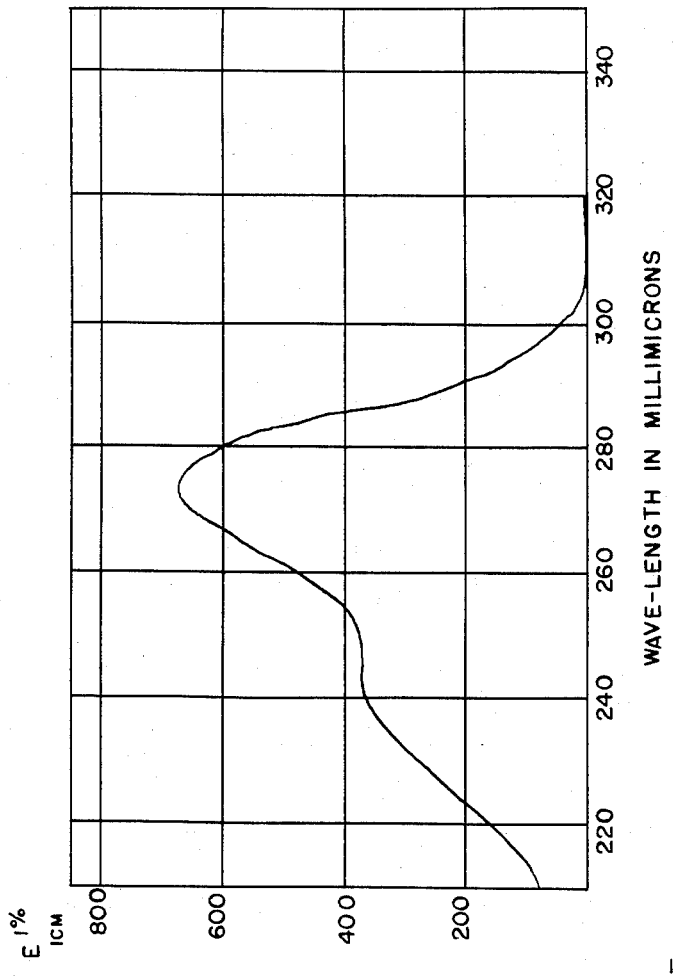

Dec. 20, 1960    A. M. MOORE ET AL    2,965,633
6-DIAZO-5-OXONORLEUCINE

Filed March 9, 1956    2 Sheets-Sheet 1

INVENTORS
ALEXANDER M. MOORE
HORACE A. DeWALD
ROGER D. WESTLAND
JOHN EHRLICH
QUENTIN R. BARTZ
HENRY W. DION
SALVATORE A. FUSARI

BY
*Whittemore Hulbert + Belknap*

ATTORNEYS

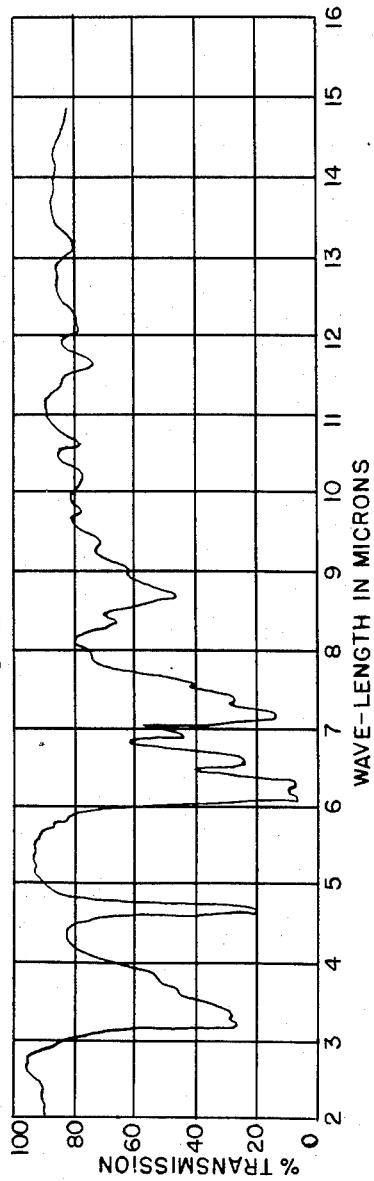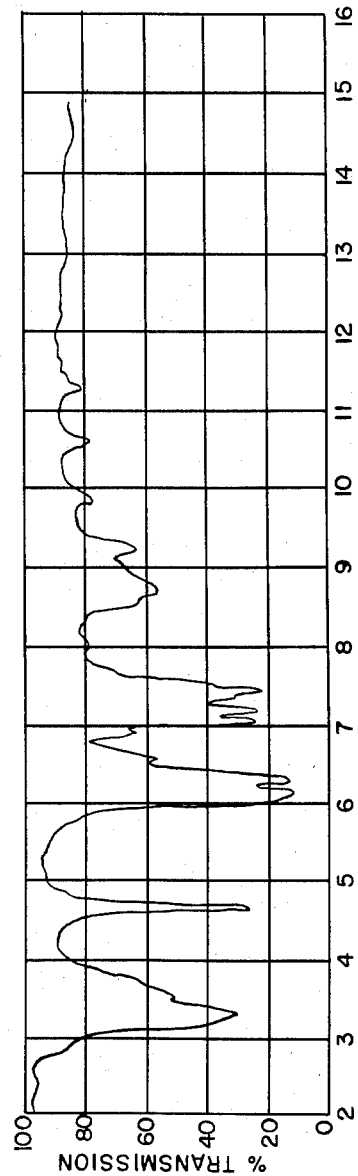

2,965,633
6-DIAZO-5-OXONORLEUCINE

Alexander M. Moore and Horace A. De Wald, Pittsburgh, Pa., and Roger D. Westland, Ann Arbor, John Ehrlich, Grosse Pointe Park, Quentin R. Bartz, Detroit, Henry W. Dion, Royal Oak, and Salvatore A. Fusari, St. Clair Shores, Mich., assignors to Parke, Davis & Company, Detroit, Mich., a corporation of Michigan Filed Mar. 9, 1956, Ser. No. 570,418

4 Claims. (Cl. 260—239)

This invention relates to new amino acid compounds and methods for producing the same. More particularly, the invention relates to new amino acid compounds, namely, 6-diazo-5-oxonorleucines and the intermediate norleucine derivatives used for their production. The invention also relates to methods for producing 6-diazo-5-oxonorleucines and certain intermediate compounds used in their production.

The 6-diazo-5-oxonorleucines, specifically D-6-diazo-5-oxonorleucine, L-6-diazo-5-oxonorleucine and DL-6-diazo-5-oxonorleucine, possess unique properties as will appear from the description that follows. Since these compounds differ from one another in a chemical sense only in that the former are optically active isomeric forms and the latter is the optically racemic form of 6-diazo-5-oxonorleucine, the chemical properties of these compounds are identical as are many of their physical properties. These compounds contain only the elements carbon, hydrogen, oxygen and nitrogen and have the empirical formula $C_6H_9N_3O_3$. They have a molecular weight of 171 and can be represented by the structural formula

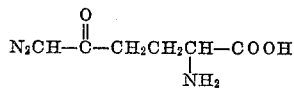

The specific optical rotation $[\alpha]_D^{26}$ of L-6-diazo-5-oxonorleucine is $+21°$ (5.4% in water) and of D-6-diazo-5-oxonorleucine, $-16.1°$ (1.98% in water at 25° C.).

D-6-diazo-5-oxonorleucine, L-6-diazo-5-oxonorleucine and DL-6-diazo-5-oxonorleucine are relatively unstable to heat and decompose before melting. Decomposition does not occur at any specific temperature and consequently, the decomposition and melting points vary over a wide range depending upon the method used in their determination. Decomposition usually begins at about 145° C. and may continue until 155° C. is reached. Decomposition is accompanied by gas evolution. The compounds decompose in aqueous acid with the liberation of nitrogen. Hydrogen binding curves show values for $pK_a'$ in water of 2.1 and 8.95.

The products are very soluble in water but insoluble in common non-polar organic solvents. They are only very slightly soluble in absolute methanol, absolute ethanol or acetone in the cold, but are soluble in a warm aqueous solution of these solvents. They give specific blue-purple ninhydrin color tests. Periodic acid oxidation of L-6-diazo-5-oxonorleucine gives L-glutamic acid. A similar reaction with D-6-diazo-5-oxonorleucine or DL-6-diazo-5-oxonorleucine gives D-glutamic acid or DL-glutamic acid, respectively.

The products form metal salts upon reaction with alkali metal or alkaline earth metal hydroxides, carbonates, bicarbonates, oxides, alkoxides, amides and the like.

The ultraviolet absorption spectra (Fig. 1) of D-6-diazo-5-oxonorleucine, L-6-diazo-5-oxonorleucine and DL-6-diazo-5-oxonorleucine are identical. In aqueous phosphate buffer at pH 7, characteristic ultraviolet absorption maxima are obtained of $$E_{1\,cm}^{1\%}.$$

equal to 683 at a wave-length of 274 millimicrons and of 376 at a wave-length of 244 millimicrons.

The infrared absorption spectra (Fig. 2) of D-6-diazo-5-oxonorleucine and L-6-diazo-5-oxonorleucine are identical. When determined by the potassium bromide disk method, the spectrum shows absorption peaks at the following wave-lengths: 3.19, 3.32, 3.78, 4.66, 6.14, 6.30, 6.59, 6.90, 7.18, 7.39, 7.54, 8.33, 8.66, 8.98, 9.36, 9.71, 10.08, 10.22, 10.59, 11.65, 12.08, 12.34 and 13.16 microns.

The infrared absorption spectrum (Fig. 3) of DL-6-diazo-5-oxonorleucine, determined by the potassium bromide disk methods, shows absorption peaks at the following wave-lengths: 3.34, 4.66, 6.13, 6.31, 6.59, 7.06, 7.19, 7.43, 8.72, 9.26, 9.90, 10.67 and 11.32 microns.

The compounds of the invention possess pronounced phytotoxic properties and are particularly useful as herbicides, deweeding agents and the like. For this purpose, a dilute aqueous solution is employed and the solution applied to the plant or plant crop in accordance with methods which are known in the art. The compounds are effective in high dilution and in addition have a selective action against certain undesirable weed species. For example, in the case of L-diazo-5-oxonorleucine, an aqueous solution at a concentration of 1,000 parts per million applied in a spray to the point of drip off to separate vigorously growing test plots of lambsquarter and pigweed gives 100% kills whereas the growth of a comparable plot of corn is inhibited to the extent of only 20% under identical conditions.

The compounds of the invention possess a high degree of activity against yeasts. Because of this characteristic they are useful in the isolation of bacteria from mixed microbial populations in which one or more of the components is a yeast.

The common or generic name "diazoöxonorleucine" has been adopted for L-6-diazo-5-oxonorleucine.

In accordance with the invention, chemical synthetic means are provided for the production of D-6-diazo-5-oxonorleucine, L-6-diazo-5-oxonorleucine and DL-6-diazo-5-oxonorleucine and a microbiological method is also provided for the production of L-6-diazo-5-oxonorleucine.

D-6-diazo-5-oxonorleucine, L-6-diazo-5-oxonorleucine and DL-6-diazo-5-oxonorleucine can be produced by chemical synthetic methods starting from various derivatives including derivatives of glutamic acid or norleucine. The following diagram shows the transformations involved in the chemical synthesis of the products of the invention. It is to be understood that the formulas set forth, as well as other formulas throughout the specification or claims, in the absence of a specific designation to the contrary, represent the D-optical isomer, the L-optical isomer, or the DL-optically inactive form of the chemical compounds. The same convention, on the absence of a designation to the contrary, is to be applied to the chemical names appearing in the specification or claims. Thus, where a chemical name does not specify which optical form is intended, the name is to be interpreted in its generic sense, that is, as meaning either the D-optical isomer, the L-optical isomer or the optically racemic DL-form.

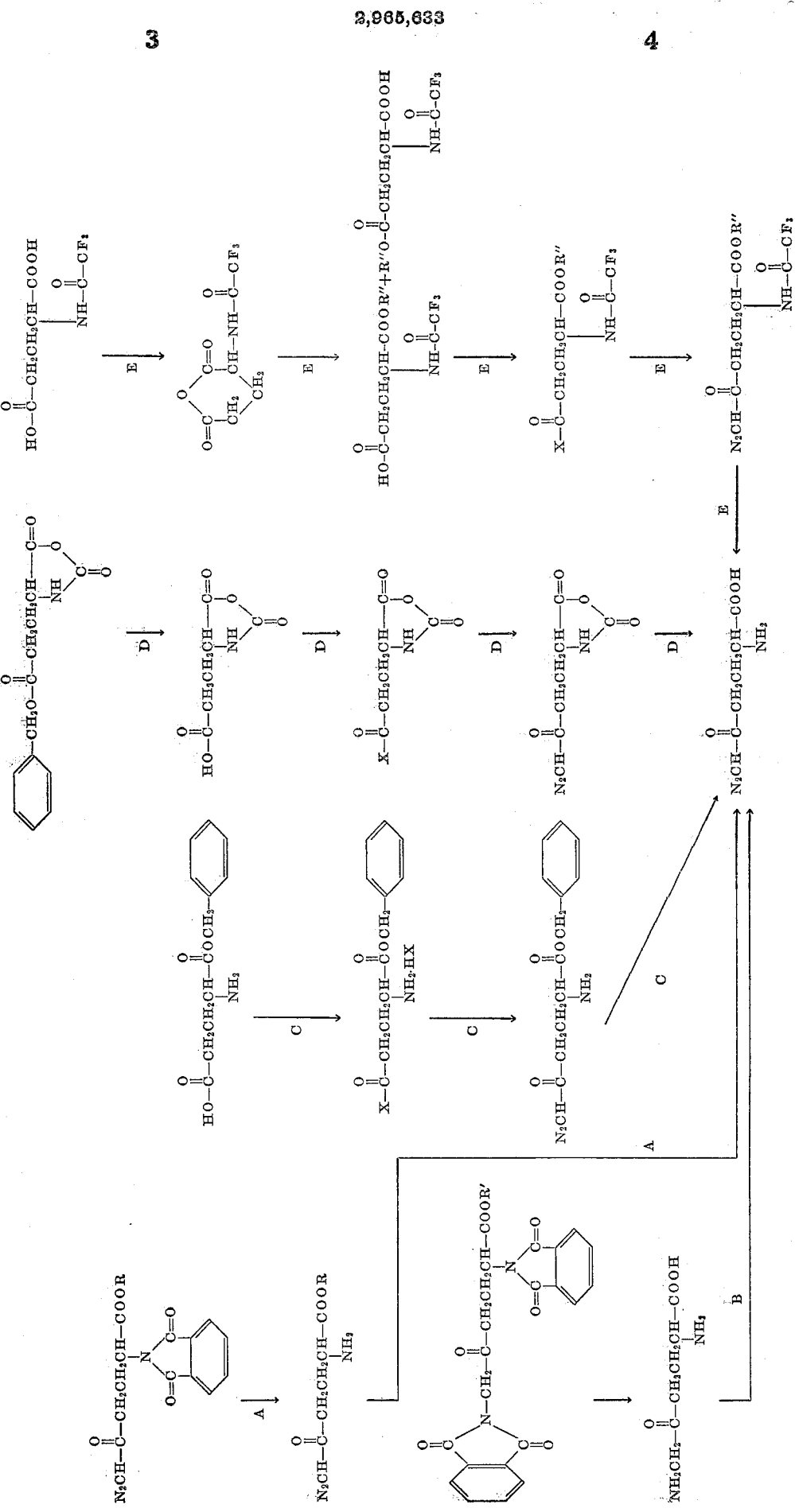

In the above diagram, R represents an alkali or alkaline earth metal radical or a lower alkyl radical, R' represents a lower alkyl radical, R" represents a lower alkyl or benzyl radical and X is a chlorine or bromine radical.

In the production of the compounds of the invention, the method designated in the diagram as A involves reacting hydrazine and a lower alkyl ester or alkali metal or alkaline earth metal salt of 6-diazo-5-oxo-N-phthaloylnorleucine to obtain the corresponding 6-diazo-5-oxonorleucine ester or metal salt. The intermediate ester product is converted to the alkali metal or alkaline earth metal salt of 6-diazo-5-oxonorleucine by hydrolysis. The metal salt, however obtained, is converted to the free amino acid, 6-diazo-5-oxonorleucine, by neutralization. For hydrazineolysis, two equivalents of hydrazine are employed for best results. A slight excess, i.e. less than three equivalents, of hydrazine may be employed; greater amounts tend to cause formation of the corresponding hydrazide thereby lowering the yield of the desired 6-diazo-5-oxonorleucine intermediate. The hydrazine can be supplied to the reaction mixture in various forms. For example, aqueous solutions of hydrazine or hydrazine hydrate can be used in the process. The reaction in the case where the intermediate product is a metal salt is carried out under aqueous conditions and, where the product is an ester, in an organic solvent such as a lower aliphatic alcohol, chlorinated hydrocarbon, cyclic ether and the like. Specific examples of solvents which can be employed are methanol, ethanol, chloroform, methylene chloride, dioxane, etc. The reaction can be conveniently carried out at temperatures below about 50° C. and preferably at room temperature or below. The esters of 6-diazo-5-oxo-N-phthaloylnorleucine can be prepared by the method described in J. Am. Chem. Soc., 72, 2469 (1950), for the preparation of the methyl ester of 6-diazo-5-oxo-N-phthaloylnorleucine.

The hydrolysis of the ester of 6-diazo-5-oxonorleucine is carried out in an aqueous medium under alkaline conditions below room temperature, preferably in the presence of a water-miscible organic solvent. As alkaline agents, alkali metal or alkaline earth metal hydroxides, carbonates, bicarbonates, oxides, alkoxides, amides and the like, can be employed. Preferably, a dilute solution, containing from 1.0 to 1.1 equivalents, of an alkali metal hydroxide such as sodium hydroxide or potassium hydroxide is employed at a temperature in the range from −10 to 5° C. Hydrolysis is ordinarily complete within one hour at 0° C. and within one to two hours at 4° C. The neutralization of the alkali metal or alkaline earth metal salt of 6-diazo-5-oxonorleucine is carried out with acid below room temperature, preferably between −10 to 5° C. For this purpose, a mineral acid such as hydrochloric acid, hydrobromic acid, sulfuric acid, phosphoric acid and the like, is preferred. Neutralization is accomplished by carefully lowering the pH into the range of 5.5 to 7, the range of 6 to 6.5 being preferred. The product can be isolated conveniently by evaporation in vacuo, lyophilization, chromatography, etc.

The method designated as B in the above diagram comprises reacting 6-amino-5-oxonorleucine, preferably in acid addition salt form, in an aqueous medium below room temperature with a diazotizing agent. Various diazotizing agents can be used such as nitrous acid, alkyl nitrites and nitrosyl compounds. When employing nitrous acid as a diazotizing agent, one can use a solution of the nitrous acid (prepared by the reaction of nitrogen trioxide with water) or the nitrous acid can be generated in situ by the addition of a mineral acid and an inorganic nitrite such as the alkali metal or alkaline earth metal nitrites and heavy metal nitrites. Some specific examples of such inorganic nitrites are sodium nitrite, potassium nitrite, barium nitrite, silver nitrite and the like. Since the free amino acid, 6-amino-5-oxonorleucine, is relatively unstable, it is desirable to employ 6-amino-5-oxonorleucine in acid addition salt form. The reaction is carried out at pH 4 to 7, preferably 5 to 6. Where the acid addition salt is employed it is preferable not to add a mineral acid to the reaction mixture but to merely allow the salt to react with the nitrite to produce nitrous acid in situ. The nitrous acid can also be produced in situ by bubbling nitrogen trioxide through an aqueous reaction mixture. In addition, nitrous acid may be prepared by utilizing a nitrate and then adding a reducing substance such as arsenious acid to the reaction mixture. Some examples of the alkyl nitrites which can be used as a diazotizing agent are ethyl nitrite, butyl nitrite, and amyl nitrite. Some examples of the nitrosyl compounds which can be used in the process are nitrosyl chloride, nitrosyl bromide and nitrosyl sulfuric acid. The quantity of diazotizing agent used in the process is not particularly critical but, for reasons of economy, at least one equivalent should be used for each equivalent of 6-amino-5-oxonorleucine starting material. Best results are obtained when an excess of a diazotizing agent is used, and even though it is desirable to diazotize only one of the two amino groups present in the 6-amino-5-oxonorleucine starting material, as much as three to four equivalents of the diazotizing agent can be used without deleterious effect upon the yield of the desired product.

The 6-amino-5-oxonorleucine (alternatively designated as 5-oxolysines) and their acid addition salts are new compounds. The invention also contemplates the 6-amino-5-oxonorleucine compounds and their production by acid hydrolysis of a lower alkyl ester of 2,6-diphthalimido-5-oxocaproic acid. The method of production is carried out by treating the starting material with at least two equivalents, and preferably more than two equivalents, of mineral acid. For best results, 3 to 10 normal aqueous mineral acid is employed. The reaction is carried out at a temperature above 70° C. and preferably at reflux temperature. Mineral acids, such as hydrochloric acid, hydrobromic acid, sulfuric acid, phosphoric acid and the like, can be used. The resulting acid addition salt of 6-amino-5-oxonorleucine can be purified, if desired, by converting to the corresponding free base and isolating as a relatively insoluble salt such as the picrate.

The method designated as C in the above diagram involves subjecting the α-benzyl ester of glutamic acid to halogenation, reacting the resulting 4-carbobenzoxy-4-aminobutyryl halide hydrohalide with diazomethane to obtain the benzyl ester of 6-diazo-5-oxonorleucine and hydrolyzing the latter ester and neutralizing the product of hydrolysis to obtain the free amino acid, 6-diazo-5-oxonorleucine. In the first step the benzyl ester of glutamic acid is treated with at least one equivalent, and preferably an excess, of a halogenating agent such as thionyl chloride, phosphorus pentachloride, phosphorus pentabromide, phosphorus trichloride or phosphorus tribromide. When a phosphorus halide is employed as a halogenating agent, the corresponding acyl halide, particularly acetyl chloride or bromide, is conveniently employed as a solvent and the reaction is carried out below 50° C., preferably at room temperature. Inert organic solvents such as hydrocarbons, chlorinated hydrocarbons, cyclic ethers and the like can also be used. Specific examples of these solvents are benzene, toluene, dioxane, ethylene dichloride, etc. For the reaction employing thionyl chloride, a temperature below 70° C. is preferred. The optimal temperature is in the range from 20 to 50° C. Although a solvent for the reaction is ordinarily unnecessary, various solvents such as hydrocarbons, chlorinated hydrocarbons, cyclic ethers and the like can be used. Specific examples of solvents which can be used are benzene, toluene, dioxane, ethylene dichloride, etc. The starting material, α-benzyl glutamate, can be prepared by the method described in J. Am. Chem. Soc., 75, 4610 (1953), for the preparation of L-glutamic acid, α-benzyl ester.

The reaction between the 4-carbobenzoxy-4-aminobutyryl halide hydrohalide and diazomethane is carried out in the cold, that is, below 20° C. and preferably in the range of −5 to 10° C., in an inert anhydrous organic solvent. At least three equivalents of diazomethane are employed and suitable precautions are taken since this material is toxic and possesses explosive properties in the presence of oxygen, especially at elevated temperature. Hydrocarbons such as benzene, toluene and the like, lower aliphatic ethers, cyclic ethers such as dioxane, tetrahydrofuran and the like can be employed as solvents.

The hydrolysis of the resultant benzyl ester of 6-diazo-5-oxonorleucine is carried out in an aqueous medium under alkaline conditions below 30° C., preferably in the presence of a water-miscible organic solvent. As alkaline agents, alkali metal or alkaline earth metal hydroxides, carbonates, bicarbonates, oxides, alkoxides, amides and the like can be employed. Preferably, a dilute solution, containing from 1.0 to 1.1 equivalents, of an alkali metal hydroxide such as sodium hydroxide or potassium hydroxide is employed at a temperature in the range from 22 to 25° C. for one hour following which the temperature is lowered to 0° C. for about ten to twenty hours. Subsequent to hydrolysis, the reaction mixture is neutralized with acid below room temperature, preferably between −10 to 5° C. For this purpose an acid such as hydrochloric acid, hydrobromic acid, sulfuric acid, phosphoric acid, acetic acid and the like, may be employed. Neutralization is accomplished by carefully lowering the pH into the range of 5.5 to 7, the range of 6 to 6.5 being preferred.

The method designated as D in the above diagram involves subjecting γ-benzyl-N-carboxyglutamate anhydride to hydrogenation to obtain N-carboxyglutamate anhydride, treating the anhydride with a halogenating agent to obtain 4-halocarbonylethyloxazolidine-2,5-dione, reacting the resulting product with diazomethane to obtain 4-(4-diazo-3-oxobutyl)-oxazolidine-2,5-dione and hydrolyzing the latter product and neutralizing the product of hydrolysis to obtain 6-diazo-5-oxonorleucine. The hydrogenation step is accomplished at room temperature or above with a noble metal catalyst such as palladium. The reaction is preferably carried out at a temperature in the range from 25 to 80° C. Hydrogen pressure is maintained during the reaction in the range from 10 to 60 pounds per square inch. Greater hydrogen pressures are ordinarily unnecessary. An inert organic solvent, for example, an alkyl ester of a lower fatty acid such as ethyl acetate or a cyclic ether such as dioxane or tetrahydrofuran, is ordinarily employed for the reaction.

In converting γ-benzyl-N-carboxyglutamate anhydride to 4-halocarbonylethyloxazolidine-2,5-dione at least one equivalent of a halogenating agent such as thionyl chloride, phosphorus trichloride or pentachloride, phosphorus tribromide or pentabromide, etc., is employed. The reaction is conveniently accomplished by mixing the halogenating agent and N-carboxyglutamate anhydride together, preferably at moderately elevated temperature. While ordinarily unnecessary, an organic solvent such as benzene can be employed if desired. The starting material, γ-benzyl-N-carboxyglutamate anhydride, can be prepared by the method described in J. Am. Chem. Soc., 76, 4492 (1954).

The reaction between the 4-halocarbonylethyloxazolidine-2,5-dione and diazomethane is carried out in the cold, that is, below 20° C. and preferably in the range of −5 to 10° C., in an inert organic solvent. At least two equivalents of diazomethane are employed. Hydrocarbons such as benzene, toluene and the like, lower aliphatic ethers, cyclic ethers such as dioxane, tetrahydrofuran and the like, can be employed as solvents.

The hydrolysis of the resultant 4-(4-diazo-3-oxobutyl)-oxazolidine-2,5-dione to 6-diazo-5-oxonorleucine is carried out in water alone, or in an aqueous medium under alkaline conditions, below 30° C. As alkaline agents, alkali metal or alkaline earth metal hydroxides, carbonates, bicarbonates, oxides, alkoxides, amides and the like, can be employed. Preferably, a dilute solution, containing approximately one equivalent of an alkali metal hydroxide such as sodium hydroxide or potassium hydroxide is employed at a temperature in the range from −5 to 10° C. The reaction ordinarily takes place almost immediately at 5° C. When the hydrolysis is complete, the reaction mixture is neutralized with acid at room temperature or below. For this purpose, a mineral acid such as hydrochloric, hydrobromic, sulfuric or phosphoric acid may be employed. Neutralization is accomplished by carefully lowering the pH into the range of 5.5 to 7, the range of 6 to 6.5 being preferred.

The method designated as E in the above diagram involves reacting N-trifluoroacetylglutamic acid and acetic anhydride to obtain N-trifluoroacetylglutamic anhydride, reacting the latter anhydride with an alcoholic agent to obtain a mixture of the α- and γ-esters of trifluoroacetylglutamic acid, reacting the resulting ester product with a halogenating agent to obtain 4-carbobenzoxy- or 4-carbalkoxy-4-trifluoroacetamidobutyryl halide, treating the halide with diazomethane to obtain 6-diazo-5-oxo-N-trifluoroacetylnorleucine ester and hydrolyzing the latter ester and neutralizing the product of hydrolysis to obtain 6-diazo-5-oxonorleucine.

The reaction between N-trifluoroacetylglutamic acid and acetic anhydride is carried out, preferably in the absence of solvent, at room temperature or above under anhydrous conditions. In order to minimize the possibility of racemization, it is desirable to carry out the reaction at temperatures not in excess of 100° C. At least one equivalent, and preferably an excess, of acetic anhydride is employed. For best results, the reaction temperature is maintained between 25 to 100° C.

The alcoholysis of N-trifluoroacetylglutamic anhydride is accomplished with an alcoholic agent such as an alkali metal alkoxide or benzylate or an alcohol. Specific examples of alcoholic agents which can be used are sodium methoxide, sodium ethoxide, sodium benzylate, methanol, ethanol, benzyl alcohol and the like. In the use of the alkoxides or benzylates, an alcoholic solvent is ordinarily employed in which the hydrocarbon portion corresponds to the hydrocarbon portion of the alcoholic agent. For example, methanol is ordinarily employed in conjunction with sodium methoxide; benzyl alcohol with sodium benzylate; etc. The reaction is carried out at room temperature or below, preferably in the range from −20 to 0° C. The reaction employing an alcohol, as distinguished from an alkoxide or benzylate, is relatively slow; and higher temperatures, that is, temperatures in the range from 20 to 150° C., are preferred. The product of esterification is a mixture of the α- and γ-esters of N-trifluoroacetylglutamic acid. Although the α-ester is the desired starting material for the subsequent halogenation step of the process, it is unnecessary to remove the γ-ester since the mixture itself can be satisfactorily employed as a starting material.

In the halogenation step the product of the preceding esterification step is reacted with at least one equivalent and preferably an excess, of halogenating agent such as thionyl chloride, phosphorus trichloride or tribromide, phosphorus pentachloride or pentabromide. When a phosphorus halide is employed as a halogenating agent, the corresponding acyl halide such as acetyl chloride or bromide is conveniently employed as a solvent and the reaction is carried out below 50° C., preferably at room temperature. Inert organic solvents such as hydrocarbons, chlorinated hydrocarbons, cyclic ethers and the like can also be used. Specific examples of these solvents are benzene, toluene, dioxane, ethylene dichloride. For the reaction employing thionyl chloride a temperature below 80° C. is preferred. The optimal temperature is in the range from 50 to 80° C. Various solvents such as hydrocarbons, chlorinated hydrocarbons, cyclic ethers and the like, can be used although the reaction with thionyl chloride is preferably carried out in the absence of a solvent. The product of halogenation is 4-carbobenzoxy- or 4-carbalkoxy-4-trifluoroacetamidobutyryl halide.

The reaction between the 4-carbobenzoxy- or 4-carbalkoxy-4-trifluoroacetamidobutyryl halide and diazomethane is carried out in the cold, preferably in the range of —5 to 10° C., in an inert organic solvent. At least two equivalents of diazomethane are employed. Hydrocarbons such as benzene, toluene and the like, lower aliphatic ethers, cyclic ethers such as dioxane, tetrahydrofuran and the like, can be employed as solvents. The reaction is ordinarily complete in one-half hour at 0–5° C. The product is 6-diazo-5-oxo-N-trifluoroacetylnorleucine ester.

The hydrolysis of the diazo-oxotrifluoroacetylnorleucine ester to 6-diazo-5-oxonorleucine is carried out in an aqueous alkaline medium at a temperature below about 30° C. The reaction is favored by the use of water-miscible organic solvents such as lower aliphatic alcohols or the like. As alkaline agents, alkali metal or alkaline earth metal hydroxides, carbonates, bicarbonates, oxides, alkoxides, amides and the like can be employed. Preferably, a dilute solution, containing two equivalents of an alkali metal hydroxide such as sodium hydroxide or potassium hydroxide is employed at a temperature in the range from —10 to 0° C. The hydrolysis is ordinarily complete within eight to twelve hours. The hydrolysis product which is in the form of a metal salt is converted to the free acid 6-diazo-5-oxonorleucine by neutralizing the reaction mixture with acid below room temperature. For this purpose, a mineral acid such as hydrochloric, hydrobromic, sulfuric or phosphoric acid may be employed. Neutralization is accomplished by carefully lowering the pH into the range of 5.5 to 7 and preferably 6 to 6.5. The product of hydrolysis and neutralization is conveniently isolated by selective adsorption and elution methods and the eluate is purified by drying from the frozen state and crystallizing the solid residue from a suitable solvent. Alternatively, the hydrolysis of the diazo-oxotrifluoroacetylnorleucine ester to 6-diazo-5-oxonorleucine can be accomplished by enzymatic means employing for example a combination of esterase and acylase such as may be obtained from hog kidneys.

The following representative examples illustrate in detail how the production by chemical synthesis of D-6-diazo-5-oxonorleucine, L-6-diazo-5-oxonorleucine, DL-6-diazo-5-oxonorleucine and the various intermediate products can be carried out.

PRODUCTION OF 6-DIAZO-5-OXONORLEUCINE FROM N-PHTHALOYLGLUTAMIC ACID ESTERS

Example 1

(a) 4.3 grams of L-6-diazo-5-oxo-N-phthaloylnorleucine, methyl ester, is dissolved in 70 ml. of methylene dichloride; 1.35 g. of hydrazine hydrate is added and the mixture is stirred for about two hours and allowed to stand at 20–25° C. for sixteen hours. The reaction mixture is then stored at 0° C. for four hours and filtered. The filter cake contains the hydrazine salt of phthaloyl hydrazide. The filtrate is evaporated in vacuo. The residual product is L-6-diazo-5-oxonorleucine, methyl ester, which has the formula

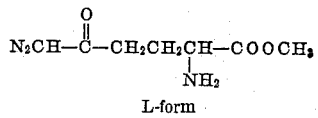

L-form (b) 2.2 grams of L-6-diazo-5-oxonorleucine, methyl ester, is dissolved in 60 ml. of methanol and cooled to 0° C., 15 ml. of one normal sodium hydroxide is added and the solution stored at 0° C. for sixteen hours. The cold solution is adjusted to pH 6.5 by the addition of 2 normal hydrochloric acid with rapid stirring. The yellow solution is evaporated in vacuo to remove the methanol. The residual product is dissolved in about 50 ml. of water, the solution is frozen and the ice sublimed from the frozen mass under high vacuum. 250 milligrams of the solid residue is dissolved in 10 ml. of water containing 1% acetone and the solution is poured into an adsorption column containing 15 g. of activated carbon and 15 g. of diatomaceous earth. The column is immediately washed and developed with approximately 2.5 hold-up volumes of 1% aqueous acetone and the eluate is collected in 10 ml. fractions. The three fractions showing the strongest ultraviolet absorption at a wave-length of 275 millimicrons are frozen and the ice sublimed from the frozen mass under high vacuum to obtain the desired L-6-diazo-5-oxonorleucine which has the formula

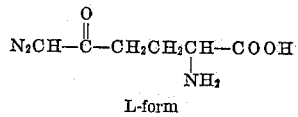

L-form

The product can be purified by recrystallization from solution in several drops of water by addition of five volumes of absolute ethanol. The chemical, biological and physical properties of the L-6-diazo-5-oxonorleucine are the same as those set forth in the foregoing description.

The opposite optical isomer, D-6-diazo-5-oxonorleucine, can be prepared by the same method set forth under Example 1(a) and (b) starting from D-6-diazo-5-oxo-N-phthaloylnorleucine ester.

Example 2

(a) A solution of 24 g. of DL-6-diazo-5-oxo-N-phthaloylnorleucine, methyl ester, in 170 ml. of methylene chloride is treated with 7.7 g. of hydrazine hydrate and the cloudy solution is stirred at 22–25° C. for fifteen hours and is then filtered. The filtrate is evaporated in vacuo. The residual product, DL-6-diazo-5-oxonorleucine, methyl ester, has the formula

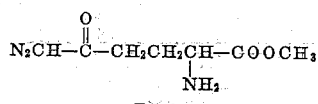

DL-form (b) 12.5 grams of DL-6-diazo-5-oxonorleucine, methyl ester, is dissolved in 300 ml. of methanol and cooled to 0° C. 70 milliliters of 1 normal sodium hydroxide is added and the pale red solution is stored at 0° C. for sixteen hours. The pH of the solution is adjusted to 6.5 with 2 normal hydrochloric acid, and the mixture is evaporated in vacuo to remove the methanol. The residue is frozen and the ice sublimed from the frozen mass under high vacuum. The solid residue is dissolved in 1% aqueous acetone and adsorbed on a column containing 45 g. of activated carbon and 45 g. of diatomaceous earth. The column is washed and developed with approximately 2.5 hold-up volumes of 1% aqueous acetone and the eluate is collected in 10 ml. fractions. The fractions showing the strongest ultraviolet absorption at 275 millimicrons are frozen and the ice is sublimed from the frozen mass to obtain the desired DL-6-diazo-5-oxonorleucine. This product, which has the formula

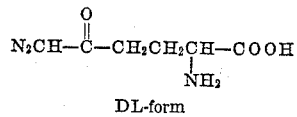

DL-form is recrystallized from aqueous alcohol to obtain material having an ultraviolet absorption, $E_{1\,cm.}^{1\%}$ of 683 at a wave-length of 274 millimicrons. The chemical, biological and other physical properties of the DL-6-diazo-5-oxonorleucine are the same as those set forth in the foregoing description.

Example 3

0.90 gram of hydrazine hydrate is added to a suspension of 3.1 g. of L-6-diazo-5-oxo-N-phthaloylnorleucine potassium salt in 60 ml. of methanol and the mixture is stirred for about two hours and allowed to stand at 20–25° C. for sixteen hours. The reaction mixture is concentrated by evaporation in vacuo. The residue is dissolved in 50 ml. of water and the pH adjusted to 6.5 with one normal hydrochloric acid. The solution is filtered and the filtrate poured into an adsorption column containing 20 g. of activated carbon and 20 g. of diatomaceous earth. The column is immediately washed and developed with about 2.5 hold-up volumes of 1% aqueous acetone, and the eluate is collected in 10-ml. fractions. The four fractions showing the strongest ultra-violet absorption at 275 millimicrons are frozen and the ice sublimed from the frozen mass under high vacuum to obtain the desired L-6-diazo-5-oxonorleucine. The chemical, biological and physical properties of the product are the same as those set forth in the foregoing description. The opposite optical isomer, D-6-diazo-5-oxonorleucine, can be prepared by the same method starting from D-6-diazo-5-oxo-N-phthaloylnorleucine potassium salt which in turn can be prepared from the corresponding alkyl ester by the method set forth immediately below.

The starting material above can be prepared in the following manner: 4.5 grams of L-6-diazo-5-oxo-N-phthaloylnorleucine, methyl ester, is dissolved in 50 ml. of 70% methanol; 2.5 g. of potassium carbonate is added and the solution is allowed to stand at 10° for twenty-four hours. The solution is evaporated in vacuo. The residual product is the potassium salt of L-6-diazo-5-oxo-N-phthaloylnorleucine, which can be used directly as a starting material for the above procedure without further processing. Other metal salts can be prepared in like manner.

PRODUCTION OF 6-DIAZO-5-OXONORLEUCINES FROM 2.6-DIPHTHALIMIDO-5-OXOCAPROIC ACID COMPOUNDS

Example 4

(a) A mixture of 5.2 g. of DL-2,6-diphthalimido-5-oxocaproic acid, methyl ester [Sheehan and Bolhofer, J. Am. Chem. Soc., 72, 2469 (1950)] and 130 ml. of concerted hydrochloric acid (sp.g. 1.18) is stirred and heated under reflux temperatures for sixteen hours. Three 20 ml. portions of concentrated hydrochloric acid (sp.g. 1.18) are added at intervals during this period. The mixture is cooled for sixteen hours at 0° C. and filtered. The filtrate is concentrated in vacuo to a volume of 40 ml. and the concentrate is extracted several times with ether. The pH of the aqueous solution is adpusted to 7 to 8 with 4 normal sodium hydroxide, and the solution is warmed to 60° C. and added rapidly with swirling to a hot solution of 9 g. of picric acid in 100 ml. of water. The product which separates is collected by filtration, washed well with water and ethanol and then dried in vacuo; M.P. 166–168° C. The product, which is the picric acid addition salt of DL-5-oxolysine, has the formula

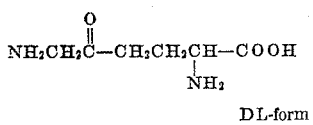
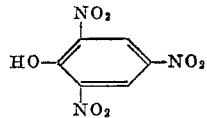

DL-form

The picrate salt is converted to the dihydrochloride by warming the material for thirty minutes in 40 ml. of concentrated hydrochloric acid (sp.g. 1.18). The mixture is cooled well and then filtered to remove the picric acid. The filtrate is extracted repeatedly with equal volumes of ether, treated with charcoal, filtered, the filtrate is frozen and the ice sublimed from the frozen mass under high vacuum. The solid residue is dissolved in 8 ml. of hot water, 35 ml. of absolute ethanol is added and the crystalline product is removed by filtration; M.P. 109–112° C. This product, DL-5-oxolysine, dihydrochloride monohydrate, has the formula

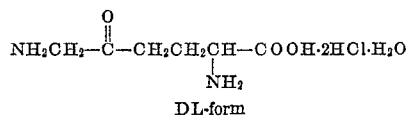

DL-form (b) A solution of 250 mg. of DL-5-oxolysine, dihydrochloride, and 10 ml. of water is cooled to 0–5° C. in an ice bath. A solution of 140 mg. of sodium nitrite in 2 ml. of water is added in one portion and the yellow solution is cooled for ten minutes in the ice bath. The reaction mixture is then frozen and the ice is sublimed from the frozen mass under high vacuum. The residual product, DL-6-diazo-5-oxo-norleucine, which has the formula

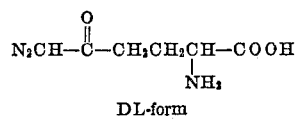

DL-form can be purified by dissolving in 10 ml. of water containing 10 ml. of 1% aqueous acetone, pouring the solution into an adsorption column containing 15 g. of activated carbon and 15 g. of diatomaceous earth, washing the column with approximately 2.5 hold-up volumes of 1% aqueous acetone and collecting the eluate in 10 ml. fractions. The three fractions showing the strongest ultra-violet absorption at a wave-length of 275 millimicrons are frozen and the ice sublimed from the frozen mass under high vacuum. The residual product, DL-6-diazo-5-oxonorleucine, is recrystallized by dissolving in several drops of water and adding five volumes of absolute ethanol. The chemical, biological and physical properties of the DL-6-diazo-5-oxonorleucine are the same as those set forth in the foregoing description.

The individual optical isomers, i.e., the L- and D-6-diazo-5-oxonorleucines, can be prepared by the same method described in (a) and (b) above starting from L- and D-2,6-diphthalimido-5-oxocaproic acid, methyl esters, respectively, which can be prepared from the corresponding L- and D-N-phthaloylglutamic anhydrides (Sheehan and Bolhofer, supra).

PRODUCTION OF 6-DIAZO-5-OXONORLEUCINE FROM α-BENZYL ESTERS OF GLUTAMIC ACID

Example 5

(a) 2.3 grams of L-glutamic acid, α-benzyl ester [Sachs and Brand, J. Am. Chem. Soc., 75, 4610 (1953)] is added with stirring at 22–25° C. to a mixture of 2.1 g. of phosphorus pentachloride and 20 ml. of acetyl chloride. A clear solution results in about one hour. After standing three hours at 22–25° C. the solution is evaporated in vacuo. The residual product, L-4-carbobenzoxy-4-aminobutyryl chloride hydrochloride, has the formula

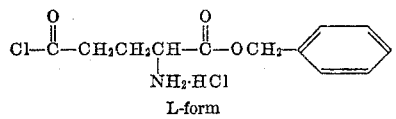

L-form (b) 2.7 grams of L-4-carbobenzoxy-4-aminobutyryl chloride hydrochloride is slowly added to a solution of three equivalents of diazomethane in 100 ml. of ether, at 0–5° C. The mixture is then allowed to warm to 22–25° C., and the solvent is then removed in vacuo.

The residual product, L-6-diazo-5-oxonorleucine, benzyl ester, has the formula

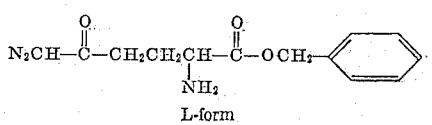

L-form (c) The L-6-diazo-5-oxonorleucine, benzyl ester, obtained in (b) above is dissolved in 50–100 ml. of methanol and 20 ml. of 0.5 N sodium hydroxide is slowly added to the solution. The mixture is allowed to stand one hour at 22–25° C. and then sixteen hours at 0° C. The pH of the reaction mixture is adjusted to 6 with glacial acetic acid at 0–5° C. and the solution is passed through an adsorption column containing 60 g. of activated carbon and 60 g. of diatomaceous earth. The column is eluted with two and one-half hold-up volumes of 1% aqueous acetone and the eluate is collected in 10 ml. fractions. The three fractions showing the strongest ultraviolet absorption at a wave-length of 275 millimicrons are frozen and the ice sublimed from the frozen mass under high vacuum. The residual product, L-6-diazo-5-oxonorleucine, is recrystallized by dissolving in a minimal amount of water and adding five volumes of warm ethanol. The chemical, biological and physical properties of the L-6-diazo-5-oxonorleucine are the same as those set forth in the foregoing description.

D-6-diazo-5-oxonorleucine and DL-6-diazo-5-oxonorleucine can be prepared by the same method starting from the D- and DL-forms of the α-benzyl ester of glutamic acid, respectively, and proceeding in accordance with (a), (b) and (c) above. The products so obtained possess the same chemical, biological and physical properties as those set forth in the foregoing description.

PRODUCTION OF 6-DIAZO-5-OXONORLEUCINE FROM γ-BENZYL-N-CARBOXYGLUTAMATE ANHYDRIDE

Example 6

(a) 2.6 g. of γ-benzyl-N-carboxy-L-glutamate anhydride is dissolved in 60 ml. of anhydrous ethyl acetate, 0.6 g. of 10% palladium on charcoal is added to the solution and the mixture shaken at room temperature for one hour with hydrogen under a pressure of 40–60 lbs. per square inch. When the reaction is complete, the catalyst is removed by filtration and the solvent evaporated from the filtrate under reduced pressure. The residual product, N-carboxy-L-glutamate anhydride, has the formula

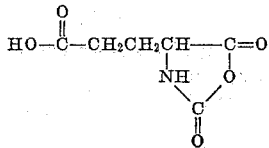

(b) The product of (a) is suspended in 15 ml. of thionyl chloride and warmed gently for fifteen minutes to obtain a clear yellow solution. The excess thionyl chloride is removed by vacuum distillation. The residual product, L-4-[2-(chlorocarbonyl)ethyl]oxazolidine-2,5-dione, has the formula

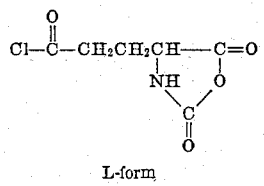

L-form (c) The product of (b) is dissolved in 20 ml. of tetrahydrofuran and the solution is added drop-wise with stirring to a solution of diazomethane (prepared from 7 g. of nitrosomethylurea) in 100 ml. of tetrahydrofuran at 0–5° C. The reaction mixture is allowed to warm to 23–25° C., filtered, and then the filtrate concentrated under reduced pressure to obtain L-4-(4-diazo-3-oxobutyl)oxazolidine-2,5-dione which has the formula

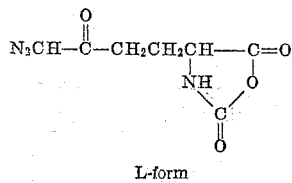

L-form (d) The product of (c) is dissolved in 30 ml. of water containing 8 ml. of one normal sodium hydroxide at room temperature. As soon as solution occurs, the pH is adjusted to 6.5 with dilute hydrochloric acid, the solution is frozen and the ice sublimed from the frozen mass under high vacuum. One gram of the residual solid is dissolved in approximately 40 ml. of water containing 1% acetone and the solution is passed through an adsorption column containing 90 g. of activated charcoal and 90 g. of diatomaceous earth. The column is washed and developed with approximately 2.5 hold-up volumes of 1% aqueous acetone and the eluate is collected in 10 ml. fractions. The three fractions showing the strongest ultraviolet absorption at 275 millimicrons are frozen and the ice is sublimed from the frozen mass under high vacuum. The residual solid, L-6-diazo-5-oxonorleucine, is recrystallized from absolute ethanol containing a few drops of water.

D-6-diazo-5-oxonorleucine and DL-6-diazo-5-oxonorleucine can be prepared by the same method starting from the D- and DL-forms of γ-benzyl-N-carboxyglutamate anhydride, respectively, and proceeding in accordance with (a) through (d) above. The products so obtained possess the same chemical, biological and physical properties as those set forth in the foregoing description.

PRODUCTION OF 6-DIAZO-5-OXONORLEUCINE FROM N-TRIFLUOROACETYLGLUTAMIC ACID

Example 7

(a) A mixture of 36 g. of N-trifluoroacetyl-L-glutamic acid and 50 ml. of acetic anhydride is heated at 100° C. on a water bath for six minutes. 150 ml. of xylene is promptly added and the reaction mixture is stored for sixteen hours at −5° C. The product which separates is removed by filtration, washed with xylene and dried in a vacuum desiccator; M.P. 66–68° C., $[\alpha]_D^{27} = -19.7°$ (4% in dioxane). The product is N-trifluoroacetyl-L-glutamic anhydride which has the formula

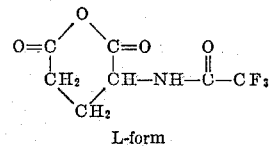

L-form (b) 21 grams of N-trifluoroacetyl-L-glutamic anhydride is quickly dissolved in 100 ml. of cold (0 to 10° C.) methanol containing 5 g. of sodium methoxide. The resultant solution is allowed to stand at 0–15° C. for four hours. The solution is concentrated in vacuo and the residual product is taken up in about 300 ml. of water. The solution is acidified to pH 1.5 with a mixture of concentrated hydrochloric acid and ice. The aqueous solution is extracted five times with 75 ml. proportions of ether, and the extracts are combined, dried over anhydrous magnesium sulfate, filtered and the filtrate concentrated in vacuo. The residual product contains a large proportion of the α-methyl ester of N-trifluoroacetyl-L-glutamic acid which has the formula

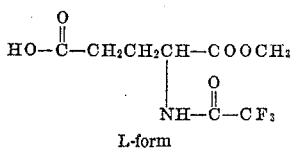
L-form

The product also contains the γ-methyl ester of N-trifluoroacetyl-L-glutamic acid. The corresponding benzyl ester product can be prepared from N-trifluoroacetyl-L-glutamic anhydride by the above procedure employing, instead of methanol and sodium methoxide, a solution of sodium benzylate prepared by reacting 10 g. of benzyl alcohol with 2.1 g. of sodium in 100 ml. of anhydrous dioxane. The resulting benzyl ester product can then be further processed in accordance with (c), (d) and (e) which follow, to obtain L-6-diazo-5-oxonorleucine.

The α-benzyl ester of N-trifluoroacetyl-L-glutamic acid can be prepared in a form which is free of the corresponding γ-ester in the following manner: 5 g. of L-glutamic acid, α-benzyl ester [Sachs et al., J. Am. Chem. Soc., 75, 4610 (1943)] is slurried in about 200 ml. of water and the pH is adjusted to 8-9 with 2 N sodium hydroxide solution. 5 grams of ethyl thioltrifluoroacetate is added and the reaction mixture is stirred for six to eight hours at 23-24° C. The mixture is adjusted to pH 2 with concentrated hydrochloric acid-ice mixture and extracted with several portions of ether. The combined ether extracts are dried and concentrated in vacuo. The residual product, N-trifluoroacetyl-L-glutamic acid, benzyl ester, has the formula

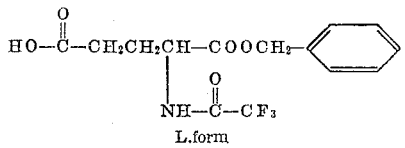
L-form

Likewise, the α-methyl ester of N-trifluoroacetyl-L-glutamic acid can be prepared in a form which is free of the corresponding γ-ester, as follows: A mixture of 50 g. of L-glutamic acid, γ-benzyl ester, 59 g. of ethyl thioltrifluoroacetate and 200 ml. of water is stirred and maintained at pH 7-8 with normal aqueous sodium hydroxide solution until there is no further tendency of the pH to shift. The reaction mixture is filtered and the filtrate extracted first with several portions of ether and then with ethyl acetate; the filter cake is slurried and extracted with ether and the ether and ethyl acetate extracts are combined, dried and concentrated in vacuo to an oil. The oil, which crystallizes on standing, is taken up in a small quantity of ether and recrystallized in two crops by adding cyclohexanebenzene (4:1) and allowing the solution to stand. The crystalline product, N-trifluoroacetyl-L-glutamic acid, γ-benzyl ester, melts at 84° C. after recrystallization from cyclohexane-benzene (1:1) and benzene-petroleum ether. A solution of 22 g. of the product in 75 ml. of ether is slowly added to 300 ml. of ethereal diazomethane (from 30 g. of moist nitrosomethylurea) at 5 to 10° C. The resulting solution is concentrated, and allowed to solidify, in vacuo. The product, N-trifluoroacetyl-L-glutamic acid, α-methyl-γ-benzyl ester, is purified by washing an ether solution of the product with dilute sodium bicarbonate and hydrochloric acid solutions and with water, drying and concentrating in vacuo. A solution of 20 g. of the product in 200 ml. of absolute methanol is hydrogenated in a Parr-apparatus over palladium-on-charcoal at 25 p.s.i. for one hour. The product, N-trifluoroacetyl-L-glutamic acid, α-methyl ester, is obtained by filtering the reaction mixture and concentrating the filtrate in vacuo; $[\alpha]_D^{28}$, $-45°$ (1.0% in ethanol).

(c) The methyl ester product of (b) is warmed on a steam bath with 100 g. of thionyl chloride for forty-five minutes at reflux temperature. The resultant solution is concentrated in vacuo to a colorless oil. 25 ml. of benzene is added and all volatile material is removed in vacuo. The residual product is a mixture of L-4-carbomethoxy-4-trifluoroacetamidobutyryl chloride, which has the formula

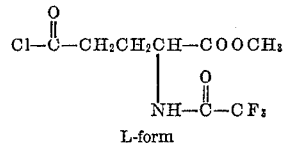
L-form and L-2-trifluoroacetamido-4-carbomethoxybutyryl chloride.

(d) The product of (c) is taken up in 200 ml. of ether and slowly added to an ethereal solution containing four equivalents (15 g.) of diazomethane at 0-5° C. The reaction mixture is allowed to stand at this temperature for approximately thirty minutes and then allowed to warm to 25° C. for two and one-half hours. The reaction mixture is filtered and the solvent is removed by vacuum distillation. The product contains methyl L-6-diazo-5-oxo-N-trifluoroacetylnorleucine ester, which has the formula

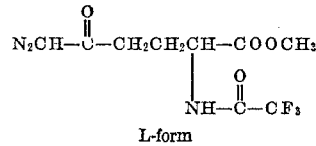
L-form (e) The product of (d) is taken up in 250 ml. of methanol at 0° C. Two liters of 0.1 N sodium hydroxide cooled to 3° C. are added and the resultant solution is stored for eleven hours at $-5°$ C. The solution is neutralized with a mixture of 2 N hydrochloric acid and ice to pH 6 and then concentrated in a circulating evaporator at temperatures of 20-30° C. to a volume of 500 ml. The product, containing L-6-diazo-5-oxonorleucine which has the formula

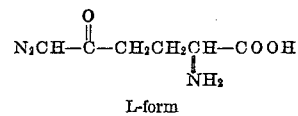
L-form can be purified by selective adsorption and elution from an adsorbent in the following manner: A solution containing not more than 3 g. of L-6-diazo-5-oxonorleucine as determined by bioassay is poured into a column containing a mixture of 200 g. of activated carbon and 200 g. of diatomaceous earth. The product is eluted with about 2.5 hold-up volumes of 1% aqueous acetone and the eluate is collected in one-tenth hold-up volume fractions. The fractions showing the strongest ultraviolet absorption at 275 millimicrons are frozen and the ice sublimed from the frozen mass to yield L-6-diazo-5-oxonorleucine as a light yellow powder. The powder on recrystallization from ethanol has an optical rotation, $[\alpha]_D^{26}$, of $+21°$ (c.=5.4% in water). The chemical, biological and other physical characteristics of the product are the same as those set forth in the preceding description. D-6-diazo-5-oxonorleucine and DL-6-diazo-5-oxonorleucine can be prepared by the same method starting from N-trifluoroacetyl-D-glutamic acid and N-trifluoroacetyl-DL-glutamic acid, respectively, and proceeding in accordance with (a) through (e) above. The chemical, biological and other physical properties of the D-6-diazo-5-oxonorleucine and DL-6-diazo-5-oxonorleucine so produced are the same as those set forth in the preceding description.

As mentioned above, L-6-diazo-5-oxonorleucine can, in accordance with the invention, be produced by microbiological synthetic means as well as by chemical synthetic means. The microbiological synthetic method for the production of this substance involves cultivating a microorganism herein designated as Streptomyces C-2943 under artificial conditions in a suitable nutrient medium. The details of this procedure are hereinafter described.

Streptomyces C-2943 is a hitherto unknown microorganism which occurs in soils. It was first isolated from a soil sample collected at Chincha, Peru. Cultures of the living organism have been added to the permanent collections of the Culture Bureau of Parke, Davis & Company, Detroit 32, Michigan, under No. 04997 and to the culture collections of the Fermentation Division, Northern Utilization Research Branch, U.S. Department of Agriculture, Peoria, Illinois, under NRRL No. 2552.

Cultures of this microorganism can be obtained by preparing a suspension in sterile water of a soil sample containing it, allowing the heavier particles to settle, plating out the resultant supernatant soil suspension in serial dilutions on nutrient agar plates, incubating the plates at 24 to 28° C. to provide microorganism growths and transplanting selected individual growths resembling Streptomyces C-2943 to fresh nutrient agar plates. By repeatedly selecting and transplanting uncontaminated, characteristic growths to fresh nutrient agar plates, thalli constituting pure cultures of the desired microorganism are obtained.

Streptomyces C-2943 is an aerobic and aerially sporulating member of the order Actinomycetales and belongs to the genus Streptomyces as described in the Sixth Edition of Bergey's Manual of Determinative Bacteriology. The organism has the following characteristics: when cultured on glucose-tryptone or nutrient agar media, the primary substratal mycelium is gray to black; on asparagine-glycerol or glucose-synthetic agar media, the mycelium is white or light gray to light purple or light red to gray; and on Czapek's or calcium-malate agar media, white to light yellow to gray. On these media, the aerial mycelium is at first white, later turning to gray. When the organism is cultivated in glucose-tryptone or nutrient agar media a dark brown or black coloration appears in the substrate but when cultured in glycerol-asparagine, Czapek's or calcium-malate agar media the color of the medium remains essentially unchanged. Microscopically, the aerial hyphae are long, ranging from approximately 100 to 500 microns in length. Primary and sometimes secondary branching occurs. Terminal loops and spirals occur. The spirals vary in length and consist of 2 to 15 turns. The coils are often loose and irregular. Distal portions of these aerial hyphae subdivide into spore chains.

The organism liquifies gelatin slowly, forming a dark brown color in the medium, and usually does not peptonize litmus milk. In synthetic medium [Pridham et al., J. Bacteriology, 56, 108 (1948)], the organism utilizes numerous carbon sources including L-arabinose, cellobiose, dextrin, glucose, D-galactose, glycerol, i-inositol, inulin, lactose, levulose, maltose, D-mannitol, D-mannose, melibiose, raffinose, rhamnose, starch, sucrose, trehalose and D-xylose; less readily adonitol, aesculin and salicin; and does not utilize dulcitol, melezitose, and D-sorbitol. The organism utilizes inorganic and organic nitrogen sources.

The production of L-6-diazo-5-oxonorleucine utilizing Streptomyces C-2943, is carried out by inoculating a suitable sterile aqueous nutrient medium with Streptomyces C-2943, incubating the resulting mixture under sterile aerobic conditions at a temperature between about 20–35° C., removing the solid material present in the culture mixture and isolating the desired L-6-diazo-5-oxonorleucine from the aqueous culture liquid.

For the inoculation, spores or conidia of Streptomyces C-2943 as well as aqueous suspensions of the same containing a small amount of soap or other wetting agent can be used. For large fermentations it is preferable to use vigorous, young cultures of Streptomyces C-2943, rather than the spores or conidia or aqueous suspensions of the same.

Suitable aqueous nutrient media are those having a pH between 5.0 and 8.5 and containing carbon and nitrogen sources as well as inorganic salts. Suitable sources of carbon and nitrogen include inter alia soybean oil meal, wheat gluten meal, brewer's yeast, hog stomach (saline extracted), meat protein hydrolysate, distiller's solubles and corn steep solids. Several combinations of these carbon and nitrogen sources with other nitrogenous materials, such as a mixture of soybean oil meal, acid hydrolyzed casein and debittered yeast, a mixture of saline extracted hog stomach and soybean peptone and a mixture of soybean oil meal and acid hydrolyzed casein have also been found to produce particularly good results. The optimum concentration of these ingredients ranges from 1.5 to 2% of the total weight of the medium. The carbon source can be composed solely of the aforementioned materials, but best results are obtained when glucose or galactose is added to the medium. The concentration of glucose or galactose can vary from 0 to 2%. Concentrations above 2% appear to have a deleterious effect on the yield of the desired product. As inorganic salts, sodium chloride, ammonium chloride, ammonium nitrate, potassium chloride, calcium carbonate and the like can be used. Ammonium salts such as ammonium chloride and ammonium nitrate are particularly desirable constituents and lead to high yields of the desired product. The optimum concentration of these ammonium salts is between 0.1 to 0.5% of the nutrient medium.

The cultivation of Streptomyces C-2943 in aqueous nutrient medium can be carried out in a number of different ways. For example, microorganisms can be cultivated under aerobic conditions on the surface of this medium or they can be cultivated beneath the surface of the medium, that is, in submerged condition if oxygen is simultaneously supplied.

The preferred method for producing L-6-diazo-5-oxonorleucine by fermentation on a large scale involves the use of submerged or deep cultures of Streptomyces C-2943. According to this embodiment of the fermentation, a sterile aqueous nutrient medium is inoculated with Streptomyces C-2943 and incubated with agitation and aeration at a temperature between about 20–35° C., preferably in the neighborhood of 23–29° C., until a maximum concentration of L-6-diazo-5-oxonorleucine has been produced in the culture liquid. The length of time required for the maximum production of L-6-diazo-5-oxonorleucine varies with the size and type of equipment used. For example, in large-scale commercial fermentations, such as carried out in the tank-type fermentors, maximum production of L-6-diazo-5-oxonorleucine is reached in about thirty-two hours or less. When shaker flasks are used for the cultivation, the time of the maximum production may take longer, ranging from three to eight days, than that required for the large-scale fermentation vats. Under submerged culture conditions, the microorganism develops as more or less discrete particles dispersed throughout the nutrient medium in contrast with the more or less continuous pellicle present on the surface of the medium in the surface culture method. By virtue of this distribution of the organism throughout the media, large volumes of the inoculated nutrient medium can be cultivated at one time in the large tanks and vats customarily employed in the fermentation industry. Stationary vat fermentors equipped with suitable agitation and/or aeration devices, as well as horizontal drum fermentors, have been found to be particularly useful in this respect. However, for the preparation of smaller quantities of the antibiotic or of cultures of the microorganism, the submerged culture method may be carried out in small flasks or jars which may be either shaken or stirred by suitable mechanical means.

Agitation and aeration of the culture may be accomplished in a number of ways. Agitation may be provided by turbines, paddles, impellers or other mechanical agitation devices, by revolving or shaking the fermentor itself, by various pumping devices or by the passage of air or other oxygen-containing gases through the medium. Aeration may be effected by injecting air or other oxygen-containing gases into the fermentation mixture through open pipes, perforated pipes, porous diffusion media, such as carbon sticks, Carborundum, sintered glass and the like or it may be provided by spraying, splashing or spilling the mash into or through an oxygen-containing atmosphere.

The surface culture method of producing L-6-diazo-5-oxonorleucine involves inoculating a shallow layer usually less than 2 cm. of a sterile, aqueous nutrient medium with Streptomyces C-2943 and incubating the mixture under aerobic conditions at a temperature between about 20-35° C., preferably in the neighborhood of 23-29° C. A longer incubation period than that employed in the deep culture method is usually necessary to obtain the maximum production of L-6-diazo-5-oxonorleucine. In general, the incubation period is in the neighborhood of three to eight days.

After completion of the fermentation phase of the process, the solid material is removed from the culture liquid, for example, by filtration, centrifugation etc. L-6-diazo-5-oxonorleucine, which is contained in the resulting liquid, is isolated in concentrated or crystalline form. A convenient method of isolating the product involves concentrating the clarified culture liquid to a small volume, for example one-fifth to one-twentieth of the original volume, adding about three to ten volumes of a water-miscible organic solvent such as methanol or ethanol, separating the precipitated impurities from the solution, subjecting the purified solution to adsorption and elution with an adsorbent for L-6-diazo-5-oxonorleucine and recovering the product from the eluate. Another convenient method involves concentrating the clarified culture liquid to dryness, extracting the residual product with a water-miscible organic solvent containing less than 50% water, subjecting the extract to adsorption and elution with an adsorbent for L-6-diazo-5-oxonorleucine and recovering the product from the eluate. Adsorption is accomplished by passing the purified solution or extract referred to, through an adsorption column containing a neutral adsorbent having a pH or adjusted pH between about 5 to 8 and preferably 6 to 8. Some examples of suitable adsorbents are alumina or Brockmann's alumina. The product is eluted from the adsorbent with water or an aqueous solution of a water-miscible organic solvent. The eluate is collected in fractions and the fractions showing the strongest ultraviolet absorption at a wave-length of about 275 millimicrons are dried. Due to the unstable nature of the product at elevated temperature, it is preferable to remove the eluant by freezing the eluate and subjecting the frozen mass to high vacuum. The product can be further purified by adsorption and elution employing activated carbon. For this purpose, the dry product prepared as described above, is dissolved in a small amount of water containing a minor proportion of a water-miscible organic solvent, the pH of the solution is adjusted to 6 to 7 if necessary, the solution is passed through an adsorption column containing activated carbon and the column is eluted with water containing a minor proportion of a water-miscible organic solvent, preferably acetone. In providing the solution for the adsorption step, water containing a minor proportion of an organic solvent such as acetone, methanol, ethanol, phenol and the like, will be satisfactory. Preferably, water containing about 1% acetone is employed and sufficient solvent is used to give a solution containing about 2 to 10 mg. of L-6-diazo-5-oxonorleucine per milliliter. The amount of activated carbon required to adsorb all of the desired product from the solution varies with the concentration of L-6-diazo-5-oxonorleucine in the dry product. For example, material assaying 5% of L-6-diazo-5-oxonorleucine ordinarily requires about fifteen grams of activated carbon per gram. Best results are obtained when the activated carbon is preliminarily slurried with diatomaceous earth by reason of the fact that the latter aids in maintaining a satisfactory flow rate. Following the adsorption step, the column is eluted by washing with a suitable eluant such as water containing less than 25% of a water-miscible organic solvent. For best results, a 1% solution of acetone in water is employed. The eluate is collected in fractions and the fractions showing the strongest ultraviolet absorption at a wave-length of about 275 millimicrons are dried from the frozen state. If desired, the dry product so obtained can be further processed by recrystallization from a suitable solvent such as aqueous methanol, ethanol and the like. The product is identical in all respects with the material produced by chemical synthetic means.

The following examples illustrate in detail the production of L-6-diazo-5-oxonorleucine by microbiological synthetic means.

*Example 9*

300 milliliters of a nutrient medium having the following composition:

| | Percent |
|---|---|
| Maltose | 1.0 |
| Butanol-acetone fermentation residue | 0.5 |
| Acid hydrolyzed casein | 0.5 |
| Calcium carbonate | 0.1 |
| Sodium chloride | 0.5 |
| Water sufficient to make | 100.0 | is placed in each of two one-liter Erlenmeyer flasks and the pH adjusted to 7.5 with 6 normal sodium hydroxide solution. The nutrient medium is then sterilized by heating the flasks at 120° C. for twenty-five minutes. The medium is cooled and each of the flasks inoculated with 2 ml. of a suspension, in 40 ml. of sterile 0.01% castile soap solution, of spores from four agar (glucose-tryptone-mineral salts) slant cultures of Streptomyces C-2943. The flasks are maintained at room temperature (24-26° C.) for ninety hours with agitation supplied by mechanical shakers which rotate the flasks at 160 r.p.m. in a 2⅜-inch diameter circle. The culture liquid contains approximately one mg. of L-6-diazo-5-oxonorleucine, as determined by disk-plate agar diffusion tests involving the measurement of the extent of inhibition of the growth of the yeast *Torulopsis albida* NRRL Y1400. The culture liquid is filtered and the desired product, L-6-diazo-5-oxonorleucine, is isolated from the filtrate by adsorption and elution methods described in detail hereinafter.

*Example 10*

Twelve liters of a medium having the following composition:

| | Percent |
|---|---|
| Glucose monohydrate | 2.0 |
| Soybean oil meal | 1.0 |
| Hog stomach saline extracted | 0.5 |
| Ammonium chloride | 0.167 |
| Sodium chloride | 0.5 |
| Calcium carbonate | 0.5 |
| Water sufficient to make | 100.0 |
| Sodium hydroxide (10 N) sufficient to bring the pH to 7.5 | | are placed in a 30-liter glass fermentor equipped with stainless steel fittings including sparger, impeller, baffles and sampling line and the medium sterilized by heating at 121° C. for two hours. The post-sterilization pH of the medium is 7.8. The medium is cooled and inoculated with a suspension, in 10 ml. of sterile 0.1% sodium heptadecyl sulfate solution, of spores from an agar (glucose-tryptone-mineral salts) slant culture of Streptomyces C-2943. The inoculated medium is incubated at 25–26° C. for seventy-two hours during which time the medium is stirred at 225 r.p.m. and sterile air is passed into the medium at the rate of 12 liters per minute. During incubation, 98 ml. of a sterilized mixture of crude lard and mineral oils containing mono- and diglycerides are added as needed to control foaming. The incubated culture thus obtained is used to inoculate the main cultures as described below.

Four 30-liter glass fermentors, each containing 16 liters of the medium described above are sterilized at 121° C. for two hours, the post-sterilization pH being 7.6. The fermentors containing the sterile medium are allowed to cool to room temperature, 800-ml. aliquots from the incubated culture described above are placed in each fermentor, and the inoculated media are incubated at 25–26° C. for forty hours. Throughout the incubation period air is supplied through a sparger at the rate of 16 liters per minute and agitation is provided by an impeller operating at 200 r.p.m. During incubation, 30 ml. of a sterilized mixture of lard and mineral oils described above are added to each fermentor as needed to control foaming. The concentration of L-6-diazo-5-oxonorleucine in the fermentation media following incubation is approximately 37 micrograms per milliliter.

The solid material present in the incubated fermentation media is removed by slurrying with 1% of diatomaceous earth and filtering. The filtered material possesses the desired biological activity.

The filter cake is washed with water and the filtrates and washings are combined (41.5 liters) and concentrated in vacuo to a volume of 1920 ml. Ethanol is added to the concentrate to bring the volume to 19.2 liters, the precipitate which forms is removed by filtration and the filter cake washed with ethanol. The alcoholic filtrate (pH 6.5) is passed through an adsorption column prepared as described below.

2.3 kilograms of alumina are stirred with dilute hydrochloric acid so that the pH remains constant at 6.4. The alumina is removed, washed with water and activated by heating at 200° C. for four hours. The alumina is stirred with 90% aqueous ethanol and packed into a column having a diameter of 10 cm. (hold-up volume, 2300 ml.; gravity flow rate, 5 liters per hour).

The alcoholic filtrate prepared above is passed into the adsorption column and the column is washed successively with 1.9 liters of 90% aqueous ethanol and 12.1 liters of 75% aqueous ethanol. The percolate is discarded. The column is then eluted with 18 liters of 25% aqueous ethanol and the eluate collected in one-liter fractions. The first five fractions of eluate are concentrated in vacuo and the concentrate dried from the frozen state under high vacuum. The dried product possesses the desired biological activity.

8.5 grams of the dried material assaying approximately 4 percent L-6-diazo-5-oxonorleucine is dissolved in 150 ml. of one percent acetone in water (pH 6.2). An adsorption column is prepared by adding a slurry of 125 g. of activated carbon and 125 g. of diatomaceous earth in a solution of one percent acetone in water, to a column having a diameter of 6.5 cm. (hold-up volume, 800 ml.; gravity flow rate, 750 ml. per hour.) The aqueous solution containing L-6-diazo-5-oxonorleucine is passed through the column and the column is washed with 4.0 liters of one percent acetone solution. The eluate is collected in 100 ml. fractions. The fifteenth to twenty-third fractions inclusive are concentrated and the concentrate dried from the frozen state under high vacuum. The dried material is dissolved in warm 90 percent aqueous methanol and the solution is stored at 5° C. for several hours. The L-6-diazo-5-oxonorleucine which separates in crystalline form is collected and dried under vacuum;

$$E_{1\,cm.}^{1\%} = 643$$

at 274.5 millimicrons. The chemical, biological and other physical properties of the product are the same as those described in the foregoing description.

*Example 11*

(a) 150 milliliters of a nutrient medium having the following composition:

| | Percent |
|---|---|
| Glucose monohydrate | 2.0 |
| Soybean oil meal | 1.0 |
| Hog stomach saline extracted | 0.5 |
| Ammonium chloride | 0.167 |
| Sodium chloride | 0.5 |
| Calcium carbonate | 0.5 |
| Water sufficient to make | 100.0 |
| Sodium hydroxide (10 N) sufficient to bring the the pH to 7.5 | | is placed in a one-liter Erlenmeyer flask. The nutrient medium is then sterilized by heating the flask at 121° C. for one-half hour, cooled, and the flask is inoculated with 5 ml. of a suspension, in 10 ml. of sterile 0.1% sodium heptadecyl sulfate solution, of spores from an agar (glucose-tryptone-mineral salts) slant culture of Streptomyces C-2943. The flask is incubated at 26° C. for seventy-two hours with agitation supplied by a mechanical shaker which rotates the flask at 160 r.p.m. in a 2⅜-inch diameter circle. The incubated culture thus obtained is used to inoculate the 15-gallon medium described in (b) below.

(b) Fifteen gallons of nutrient medium having the composition described in (a) above is placed in a 30-gallon stainless steel fermentor and the medium sterilized by heating at 121° C. for one hour. The post-sterilization pH of the medium is 6.9. The medium is cooled and inoculated with 90 ml. of the incubated culture described above. The inoculated medium is incubated at 26° C. for twenty-four hours. During the incubation period sterile air is supplied to the medium through a sparger at the rate of 3.4 cubic feet per minute and the mixture is stirred with an impeller at 200 r.p.m. The incubated culture of Streptomyces C-2943 thus obtained is used to inoculate the 150-gallon medium described in (c) below.

(c) One hundred and fifty gallons of nutrient medium having the composition described in (a) above is placed in a 200-gallon stainless steel fermentor and is sterilized by heating at 121° C. for one hour. The post-sterilization pH of the medium is 6.7. The medium is cooled and inoculated with fifteen gallons of the incubated culture described in (b) above. The culture mixture is incubated at 27° C. for twenty-seven hours during which time sterile air is supplied to the mixture through a sparger at the rate of 25 cubic feet per minute and the mixture is agitated with an impeller at 200 r.p.m. In order to control forming, 2,4 liters of a sterile mixture of crude lard and mineral oils containing mono- and diglycerides are added from time to time as required.

The solid material present in the incubated mixture is removed by filtration through a plate-and-frame filter press precoated with diatomaceous earth and the filtrate is concentrated under reduced pressure to a volume of approximately eight gallons. The concentrate is mixed with seventy-two gallons of ethanol and the precipitate which forms is removed by filtration and discarded.

(d) A portion (47.5 gallons) of the ethanol filtrate (total volume, 76.5 gallons; pH, 5.9) is passed through an adsorption column prepared in the following manner: Fifty pounds of alumina are stirred with dilute hydrochloric acid so that the pH remains constant at 6.0. The alumina is filtered, washed with deionized water, and activated by heating at 200° C. for four hours. The alumina is stirred with 90% aqueous ethanol and packed into a 6 foot column having a diameter of six inches (hold-up volume, 4.7 gallons; flow rate, 9 gallons per hour under a pressure head of 12 pounds per square inch).

The alcoholic filtrate prepared above is percolated through the adsorption column under a positive pressure of 12 pounds per square inch and the column is washed successively with 4.7 gallons of 90 percent aqueous ethanol and 31.7 gallons of 75 percent aqueous ethanol. The column is then eluted with 28.5 gallons of 25 percent aqueous ethanol and the eluate collected in 2.4 gallon fractions. The fourth, fifth, and sixth fractions are combined, concentrated in vacuo at 35° C. and the concentrate dried from the frozen state under high vacuum.

(e) The remaining 29 gallon portion of the ethanol filtrate of (c) is chromatographed on 27 pounds of alumina according to the method described in (d) above and the eluate is concentrated and dried from the frozen state.

The dry powders of (d) and (e) are combined. The product so obtained contains 2.16 grams of L-6-diazo-5-oxonorleucine. The product is purified by adsorption and elution in the following manner: a slurry of 780 grams of activated charcoal and 780 grams of diatomaceous earth in a one percent solution of acetone in water is added to a five foot column having a diameter of four inches. The settled adsorbent bed is 22" high, has a hold-up volume of 4 liters, and a gravity flow rate of 1.75 liters per hour with a 38" head. The product is dissolved in 858 ml. of 1 percent acetone in water and the solution percolated through the column. The column is eluted with 20 liters of a 1 percent solution of acetone in water. Fractions of 500 ml. each are collected. The seventeenth to twentieth fractions inclusive are combined and concentrated in vacuo; the concentrate is frozen, and the ice sublimed therefrom under high vacuum. The product, L-6-diazo-5-oxonorleucine, is recrystallized from 90 percent aqueous methanol;

$$E_{1\ cm.}^{1\%} = 676$$

at 274 millimicrons. The crystalline product possesses the chemical, biological and physical properties described in the foregoing description.

While in the foregoing description we have set forth in detail certain embodiments of the present invention, it will be understood by those skilled in the art that considerable variation may be made in such detail without departing from the spirit of our invention.

This application is in part a continuation of our copending prior application Serial No. 530,486, filed August 25, 1955, now abandoned.

We claim:
1. 6-diazo-5-oxonorleucine.
2. D-6-diazo-5-oxonorleucine.
3. L-6-diazo-5-oxonorleucine.
4. DL-6-diazo-5-oxonorleucine.

References Cited in the file of this patent

UNITED STATES PATENTS 2,675,378 Fawett ---------------- Apr. 13, 1954
2,691,649 Hammond ------------ Oct. 12, 1954

OTHER REFERENCES

Sheehan et al.: J. Am. Chem. Soc., vol. 72, pp. 2469–2472 (1950).